United States Patent Office 3,139,515
Patented June 30, 1964

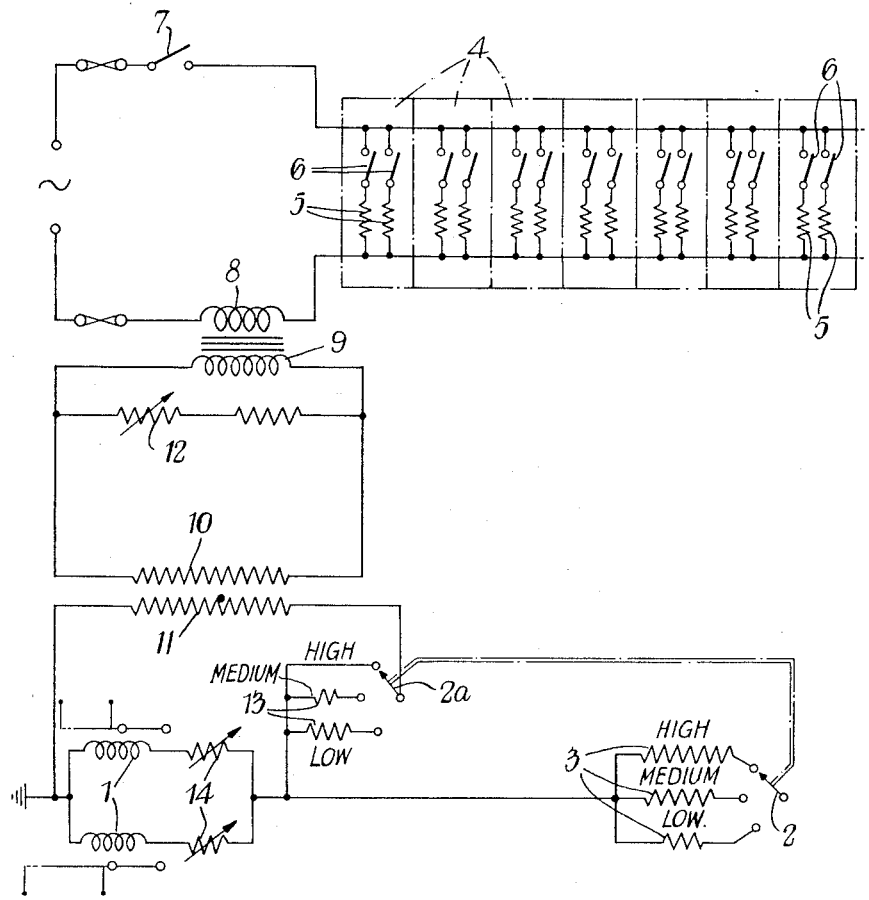

3,139,515
TEMPERATURE CONTROL FOR A
COMPARTMENTAL VEHICLE
Bertram Robert Leigh, Rickmansworth, Leonard George
Thomas, London, and Roger Lund Lack, Bromley,
Kent, England, assignors to J. Stone & Company (Deptford) Limited, London, England
Filed Dec. 19, 1961, Ser. No. 160,623
Claims priority, application Great Britain Dec. 20, 1960
6 Claims. (Cl. 219—202)

This invention concerns improvements relating to temperature control for a compartmental vehicle, especially a railway coach, in which heating in individual compartments is under the control of the occupants. An arrangement for such temperature-control is described and claimed in the specification of our patent application Serial No. 728,710, now Patent No. 3,028,471, and the present invention is, at least in some respects, concerned with improvements upon or modifications of the temperature-control arrangement claimed in that patent.

According to the said patent, an arrangement for controlling the temperature in compartments of a vehicle supplied with air from a common air-conditioning or heating equipment comprises in combination with a main thermostat controlling the said equipment and arranged to be influenced by the temperature of the air at a common return-air point, individual electric heaters for respective compartments, separately controllable switches for the said heaters, and means dependent upon the current supplied to the compartment heaters for automatically raising the effective setting of the main thermostat when individual compartment heating is switched on. With a main thermostat of the known heater-bias type, the bias applied could be caused to be varied in dependence upon the total current supplied for individual compartment heating.

In an arrangement in accordance with the present invention for controlling the temperature in compartments of a vehicle supplied with air from a common air-conditioning or heating equipment and provided with individually controllable heating means for respective compartments, the bias heating of at least one main thermostat controlling the said equipment is controlled in dependence upon the total heating current suplied to the said heating means by means of a temperature-sensitive resistor which has a negative coefficient of resistance and which is itself heated to an extent dependent upon the said total current. In other words, the resistor is used as a transform element which effects a change in the setting of the main thermostat or thermostats in dependence upon the amount of individual compartment heating switched on.

One manner of carrying the invention into effect will now be more fully described by way of example and with reference to the accompanying drawing, which is a circuit diagram of relevant parts of a control arrangement for a compartmental railway coach the main heating for which is supplied by heaters (not shown) which heat circulated air supplied to the compartments from a common air-heating installation which may, if required, also comprise air-cooling or other conditioning equipment. The air temperature is controlled in per se known manner by main thermostats, for instance mercury in-glass thermostats, whose bias heaters are indicated at 1. These thermostats are situated in the return flow of the air circulation. A temperature selector switch 2, which may be manually or automatically operated, provides for the connection of resistances 3 of different values in series with the heaters 1, so that the thermostats can be made to operate at a plurality of selected temperatures separated by, for example 3.6° F. The control circuit including the bias heaters 1 is supplied from a source of regulated D.C. direct current, at 35 volts say, by way of the switch 2 and earth.

In addition to the main heating, however, each compartment 4 of the coach is provided with small electrical heaters 5 under the control, by switches 6, of the occupants. The heaters 5 for each compartment may in practice be controlled by a switch having three positions, an off position, a position switching on one heater 5 and a position switching on both heaters 5, thus giving three different conditions of so-called "reheat" in that compartment. For example, with the off position, the temperature in the compartment might be 70°, determined by the control of the main heaters heating the air supplied to the compartment. With the second and third position of the switch, the temperature might be raised to about 72½ and 75° F. respectively. The heaters 5 are connected to a source of supply of alternating current through a main switch 7.

As explained in the aforesaid specification, it is necessary, if this arrangement is to be effective, that the main thermostats 1 should have their temperature settings raised progressively as more "reheat" is switched on by the occupants of the compartments 4. Following the above example, in the extreme case, if all the heaters 5 have been switched on to give 75° F. in all the compartments, then the settings of the thermostats 1 would have also to be raised to 75°. If this were not done and the settings were left at, say, 70° F., the only result would be that the main heaters would have less work to do, the temperatures in the compartments remaining at 70° F. Furthermore, if the heaters 5 in one compartment were then switched off, the temperature in that compartment would fall to nearly 65° F.

For effecting progressive adjustment of the setting of the main thermostats in the above-described arrangement, the sum total of the currents supplied to the heaters 5 is passed through the primary 8 of a current transformer across whose secondary 9 is connected a heater 10 wound around a temperature-sensitive resistor 11 with a substantial negative coefficient of resistance, suitably an element of the kind known as a Brimistor, type CZ6, manufactured and sold by Standard Telephones and Cables Limited. A shunt, including a manually variable resistor 12, permits of adjustment of the maximum heating of the resistor 11 and limitation of its temperature rise.

A suitable resistor 11 of the aforesaid specific type has a resistance of 3,000 ohms, ±20%, at 20° C. and 33 ohms, ±20%, at 200° C. Suitably, the bias heater 10 has a resistance of 60 ohms when cold. It may, for example, comprise approximately 40 inches of nickel-chrome wire of 0.006 inch diameter wound in 40 turns, separated from each other, in a single layer over an insulating layer of glass tape, 0.003 inch thick, wound around the resistor 11. Suitably, the resistor 11, wound with the insulating layer and bias heater 10, is mounted in an upright position on a small heat-resistant panel inside an open-sided casing. The resistor 11 may be releasably held on the panel by a simple spring clip engaging over the upper end of the resistor.

The resistor 11 itself serves as a diverter to divert a variable proportion of the bias current supplied to the heaters 1 of the main thermostats. To modify the diverting action of the resistor 11 in dependence upon the temperature setting of the switch 2, the latter has a second component 2a by which additional series resistance 13 can be introduced into the diverter circuit through the element 11 as the resistance controlled by the switch 2 itself is reduced. Trimming resistors 14 permit of fine adjustment of the settings of the thermostats and of compensation for slight variations in bias sensitivity between one thermostat and another. The normal use of these resistors 14 makes very little difference to the compensating action produced by the element 11.

The manner of operation is as follows:

As more heaters 5 are switched on, the current through the heater 10 increases proportionately, the resistor 11 is heated and its resistance decreases, diverting an increasing proportion of the bias current from the thermostat heaters 1 and raising the settings of the main thermostats.

The resistors 13 reduce the diverting effect of the resistor 11 in the "medium" and "low" positions of the main switch 2, thus compensating for the fact that it requires less shunting resistance across the bias heaters 1 to change the thermostat setdown by 5° F. from, say, 13° to 8° F. than from 5° to 0° F.

If the setdown of the main thermostats obtained with the above-described arrangement, for the "low," "medium" and "high" positions of the switch 2, is plotted against the amount of reheat expressed as a percentage of the total reheat available on the coach, it is found that the setdown varies approximately proportionately with the amount of reheat, or at least sufficiently so for practical purposes, the three curves obtained being also substantially parallel to one another.

If the supply to the heaters 5 is direct current, a diverter may be used, in place of the transformer 8, 9, for supplying the heater 10. The shunt resistance 12 is then replaced by series resistance.

We claim:

1. A vehicle having means dividing it into a plurality of compartments provided with a common air-conditioning or air-heating equipment, means for supplying air from the said equipment to said compartments of the vehicle, electrical heating means for said individual compartments, a supply circuit for the said heating means, individual control means for the said heating means in respective compartments, and automatic temperature-control means comprising at least one main thermostat controlling operation of the said equipment, an electrical bias heater on the said thermostat, a supply circuit for the said bias heater including a temperature-sensitive resistor with a negative coefficient of resistance, electrical heating means for the said resistor, and means coupled to the first-named supply circuit for supplying to the last-named heating means a current dependent upon the total heating current supplied to the first-named heating means, whereby the said resistor is itself heated to an extent dependent upon the said total current.

2. A vehicle as claimed in claim 1, wherein the said last-named heating means, in close proximity to which the said resistor is disposed, is a heater to which a current proportional to the said total current is supplied.

3. A vehicle according to claim 1, wherein the said temperature-control means further comprises adjustable means for varying the setting of the said thermostat for maintaining different temperature values of the air supplied to the compartments by the said equipment and adjustable means for varying the heating effect of the said resistor upon the said thermostat in co-ordination with the adjustment of the said means for varying the setting of the said thermostat.

4. A vehicle according to claim 1, wherein the said resistor is arranged as a diverter across the said bias heater on the said thermostat.

5. A vehicle as claimed in claim 1, wherein the said temperature-control means further comprises adjustable means for varying the setting of the said thermostat by varying resistance in series with the said bias heater and means, adjustable in conjunction with the first-named means, for varying the heating effect of the said resistor upon the said thermostat by varying resistance in series with the said resistor.

6. A vehicle as claimed in claim 1, wherein an adjustable shunt is connected across the said resistor.

References Cited in the file of this patent
UNITED STATES PATENTS 2,510,038     Rudahl _____ May 30, 1950
3,028,471     Bennett _____ Apr. 3, 1962